No. 669,017. Patented Feb. 26, 1901.
C. SLATER.
LUBRICATOR.
(Application filed Dec. 18, 1900.)
(No Model.)
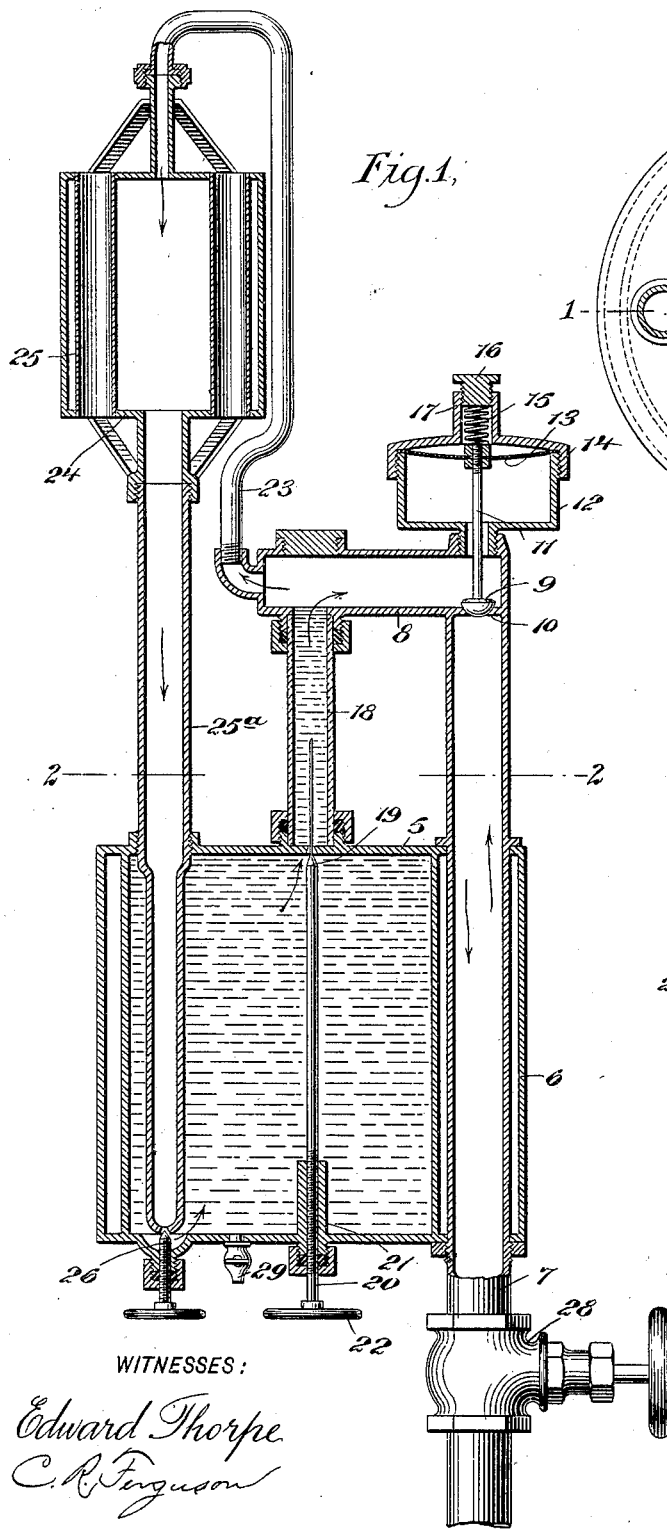
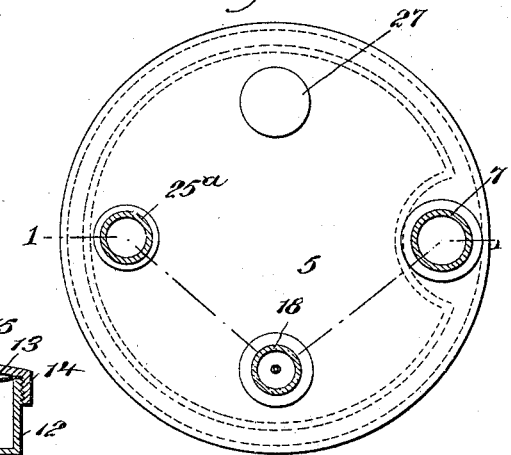
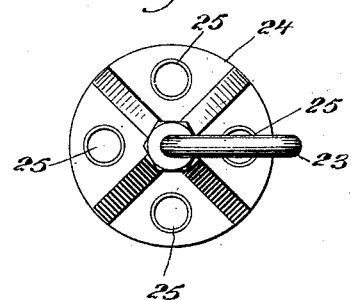
WITNESSES:
Edward Thorpe
C. R. Ferguson
INVENTOR
Charles Slater
BY
ATTORNEYS
THE NORRIS PETERS CO., PHOTO-LITHO., WASHINGTON, D. C.

UNITED STATES PATENT OFFICE.

CHARLES SLATER, OF PORTLAND, MAINE.

LUBRICATOR.

SPECIFICATION forming part of Letters Patent No. 669,017, dated February 26, 1901.

Application filed December 18, 1900. Serial No. 40,257. (No model.)

*To all whom it may concern:*

Be it known that I, CHARLES SLATER, a citizen of the United States, and a resident of Portland, in the county of Cumberland and State of Maine, have invented a new and Improved Lubricator, of which the following is a full, clear, and exact description.

This invention relates to improvements in lubricators for steam-chest valves, pistons, and the like; and the object is to provide a lubricator of simple construction and by means of which the lubricant will be kept warm or in a flowing condition, thus insuring a thorough lubrication of the parts at all times.

I will describe a lubricator embodying my invention and then point out the novel features in the appended claims.

Reference is to be had to the accompanying drawings, forming a part of this specification, in which similar characters of reference indicate corresponding parts in all the figures.

Figure 1 is a sectional elevation, on the line 1 1 of Fig. 2, of a lubricator embodying my invention. Fig. 2 is a section on the line 2 2 of Fig. 1, and Fig. 3 is a top view of the condenser.

Referring to the drawings, 5 designates an oil-cup, around which is extended a jacket 6, the space between the jacket 6 and the wall of the cup 5 providing a chamber for hot air designed to keep the lubricant in a fluid or semifluid state during cold weather. The air in this chamber is heated by the steam passing through a pipe 7, this pipe being connected either to the steam-chest or to the throttle, as desired. This pipe 7 extends through the hot-air chamber and at its upper end communicates with a mixing-chamber 8, the said communication being controlled by a valve 9, operating in a valve-seat 10 at the upper end of said pipe 7. The stem 11 of the valve extends upward into a boxing 12, and at its upper end, within said boxing, it is connected to a yielding diaphragm 13, held in connection with the boxing by means of a screw cap or cover 14. The valve is further held yieldingly in its seat by means of a spring 15, engaged at one end with the upper end of the stem 11 and at the other end with a screw-plug 16, operating in a tubular projection 17 of the cover 14. By moving this plug 16 in or out the tension of the spring 15 will be regulated so as to regulate the valve 9 to any required pressure. It is to be understood that the steam-pressure passing upward through the pipe 7 by engaging with the valve 9 moves it to its open position, and when the steam is cut off the spring 15 will close the valve.

A sight-glass 18 provides communication between the mixing-chamber 8 and the cup 5. Through this sight-glass the drops or globules of oil are designed to pass from the cup. The communication between the cup 5 and the sight-glass is controlled by a needle-valve 19, the stem 20 of which extends downward through an interiorly-tapped tube 21 at the bottom of the cup. The outer end of the stem 20 is provided with a hand-wheel 22, so that the needle-valve may be readily operated to more or less open the passage between the cup and the sight-glass.

From the chamber 8 a pipe 23 leads upward and then downward into the top of a condensing-cylinder 24. Extending longitudinally through this condensing-cylinder and open at the top and bottom are flues 25, through which cold air passes to condense the steam in the cylinder. This water of condensation passes from the condenser down through a pipe 25ª, which leads to the bottom of the oil-cup, and the opening at the lower end of this pipe is controlled by a screw-valve 26. The cup 5 has a filling-opening provided with a cap or cover 27, and during the filling the valve 26 is to be closed.

In operation upon opening a valve 28 in the pipe 7 steam will pass up through said pipe and open the valve 9, as before mentioned. This steam will then pass into the condensing-cylinder, and the condensation will pass downward and flow into the lower portion of the oil-cup, thus displacing a certain quantity of oil therein. This displaced oil will pass up through the sight-tube and downward through the pipe 7 to the parts to be lubricated. Sediment or water may be removed from the oil-cup when necessary through a petcock 29 at the bottom of said oil-cup.

Having thus described my invention, I claim as new and desire to secure by Letters Patent—

1. A lubricator, comprising an oil-cup, a jacket surrounding said oil-cup, providing a hot-air space between the cup and jacket, a steam-pipe extended through the jacket, a pressure-operated valve at the upper portion of said steam-pipe, a condenser with which said steam-pipe communicates, a pipe leading from said condenser into the oil-cup, and a tube through which oil passes from the cup to the steam-pipe, substantially as specified.

2. A lubricator, comprising an oil-cup, a jacket surrounding said oil-cup, a steam-pipe extended through the jacket, a pressure-actuated valve at the upper portion of said pipe, a condenser having communication with said steam-pipe, a pipe leading from the condenser into the oil-cup and nearly to the bottom thereof, a valve for controlling the outlet of said pipe, a sight-tube providing communication between the oil-cup and the steam-pipe, and a valve for controlling said communication, substantially as specified.

3. A lubricator, comprising an oil-cup, a jacket surrounding the oil-cup, a condenser for discharging condensation into the oil-cup, a steam-pipe leading through the jacket, a valve operating in the upper portion of said steam-pipe, a valve-stem, a boxing, a flexible diaphragm in said boxing and with which the said stem connects, a spring engaging with the upper end of said stem, means for adjusting the tension of said spring, and pipes providing communication between said steam-pipe and the condenser and between said steam-pipe and the oil-cup, substantially as specified.

4. A lubricator, comprising an oil-cup, a jacket surrounding the oil-cup and forming the outer wall of a hot-air chamber, a steam-pipe extending through the chamber, a steam-condenser having connection with the steam-pipe, and a pipe connection between said condenser and the interior of the oil-cup, substantially as specified.

In testimony whereof I have signed my name to this specification in the presence of two subscribing witnesses.

CHARLES SLATER.

Witnesses:
 MARK KIRBY,
 WALTER R. HYATT.